United States Patent
Takahashi et al.

(10) Patent No.: US 7,843,498 B2
(45) Date of Patent: Nov. 30, 2010

(54) IMAGE SIGNAL PROCESSING APPARATUS FOR SETTING A NOISE COMPONENT ATTENUATION CHARACTERISTIC

(75) Inventors: Tatsuya Takahashi, Ogaki (JP); Tomomichi Nakai, Hashima-gun (JP); Toshio Nakakuki, Mizuho (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 822 days.

(21) Appl. No.: 11/038,383

(22) Filed: Jan. 21, 2005

(65) Prior Publication Data

US 2005/0185223 A1    Aug. 25, 2005

(30) Foreign Application Priority Data

Jan. 23, 2004  (JP)  .............. 2004-015046

(51) Int. Cl.
*H04N 5/217* (2006.01)
*H04N 5/235* (2006.01)
*H04N 5/208* (2006.01)
*H04N 5/228* (2006.01)
*H04N 1/38* (2006.01)

(52) U.S. Cl. ............ 348/241; 348/362; 348/252; 348/222.1; 358/463

(58) Field of Classification Search ........... 348/254, 348/252, 241, 296, 362; 358/448, 463
See application file for complete search history.

(56) References Cited

U.S. PATENT DOCUMENTS

| | | | | |
|---|---|---|---|---|
| 5,506,798 A | * | 4/1996 | Shimada et al. | 708/315 |
| 5,818,521 A | * | 10/1998 | Hieda | 348/254 |
| 6,593,970 B1 | * | 7/2003 | Serizawa et al. | 348/229.1 |
| 2002/0039142 A1 | * | 4/2002 | Zhang | 348/234 |
| 2003/0128282 A1 | | 7/2003 | Sudo | |
| 2005/0185071 A1 | | 8/2005 | Takahashi et al. | |

FOREIGN PATENT DOCUMENTS

| | | |
|---|---|---|
| JP | A-11-112837 | 4/1999 |
| JP | A-2000-224472 | 8/2000 |
| JP | A-2001-094834 | 4/2001 |
| JP | A-2003-219210 | 7/2003 |

* cited by examiner

*Primary Examiner*—Nhan T Tran
(74) *Attorney, Agent, or Firm*—Oliff & Berridge, PLC

(57) ABSTRACT

An image signal is input to two LPFs having different transmission characteristics. A selector chooses one of outputs of the respective LPFs and delivers the chosen output to a gamma correction circuit. The switching of the selector is controlled by a filter control circuit. In the filter control circuit, a comparator compares an exposure time E of a current frame with a threshold value R. The selector is controlled so as to select an output of one of the LPFs that has a lower cutoff frequency and a greater noise component elimination effect than the other LPF does if the exposure time E is longer than or equal to the threshold value R.

3 Claims, 5 Drawing Sheets

IMAGE SIGNAL PROCESSING APPARATUS FOR SETTING A NOISE COMPONENT ATTENUATION CHARACTERISTIC

CROSS-REFERENCE TO RELATED APPLICATIONS

The priority application Number JP2004-015046 upon which this patent application is based is hereby incorporated by reference.

FIELD OF THE INVENTION

The present invention relates to an image signal processing apparatus for processing an image signal that is generated by an image pickup device. In particular, the invention relates to a technique for suppressing noise that depends on the exposure time of an image pickup device.

BACKGROUND OF THE INVENTION

Image pickup apparatuses such as digital cameras can produce an image signal having a proper signal level by adjusting the exposure time automatically or manually in accordance with the brightness of an object.

FIG. 1 is a block diagram showing the configuration of a conventional image signal processing apparatus for processing an image signal that is generated by an image pickup device. An image signal that is output from an image pickup device 2 such as a CCD (charge-coupled device) image sensor is processed by an analog signal processing circuit 4, converted to digital data by an A/D conversion circuit 6, and input to a digital signal processing circuit 8. The digital signal processing circuit 8 is equipped with an LPF (low-pass filter) 10 as a filter for eliminating noise that may cause moire. The LPF 10 traps a frequency component whose frequency is ½ of a sampling frequency in each of the vertical and horizontal directions. An output of the LPF 10 is subjected to gradation correction processing in a gamma correction circuit 12. In an automatic exposure control operation, the digital signal processing circuit 8 determines an integration value of a one-frame image signal and feedback-controls the exposure time so that the integration value comes to have a proper level.

An outline correction circuit 14 performs outline emphasis processing that is one of image quality adjustments. The principle of the outline emphasis processing is such that a second derivative waveform of an image signal that varies very much at edge portions of an image is determined, multiplied by a proper gain, and then combined with the original image signal.

The exposure time of the image pickup device is set longer as an object becomes darker. And there is a problem that the shot noise due to a dark current becomes higher as the exposure time becomes longer. Further, in the outline emphasis processing, the rise and fall of each shot noise are also detected and subjected to the outline emphasis. That is, where the outline emphasis is performed in the above manner, shot noise is enhanced in an image that is displayed on the screen. Marked deterioration in image quality is caused by enhanced shot noise due to an increased exposure time.

SUMMARY OF THE INVENTION

The present invention has been made to solve the above problems, and an object of the invention is therefore to suppress image quality deterioration due to an increased exposure time in an image signal processing apparatus for processing an image signal that is generated by an image pickup device.

An image signal processing apparatus according to one aspect of the invention comprises a filter circuit for attenuating a noise component included in an image signal, a noise component attenuation characteristic of the filter circuit being variable; and a filter control circuit for setting the attenuation characteristic of the filter circuit in accordance with an exposure time that is employed by an image pickup device in generating the image signal.

An image signal processing apparatus according to another aspect of the invention comprises an outline correction circuit for generating an edge enhanced signal by extracting a particular frequency component of an image signal; and a gain control circuit for varying a gain of the edge enhanced signal in accordance with an exposure time that is employed by an image pickup device in generating the image signal.

DESCRIPTION OF THE PREFERRED EMBODIMENT

Figure 1:
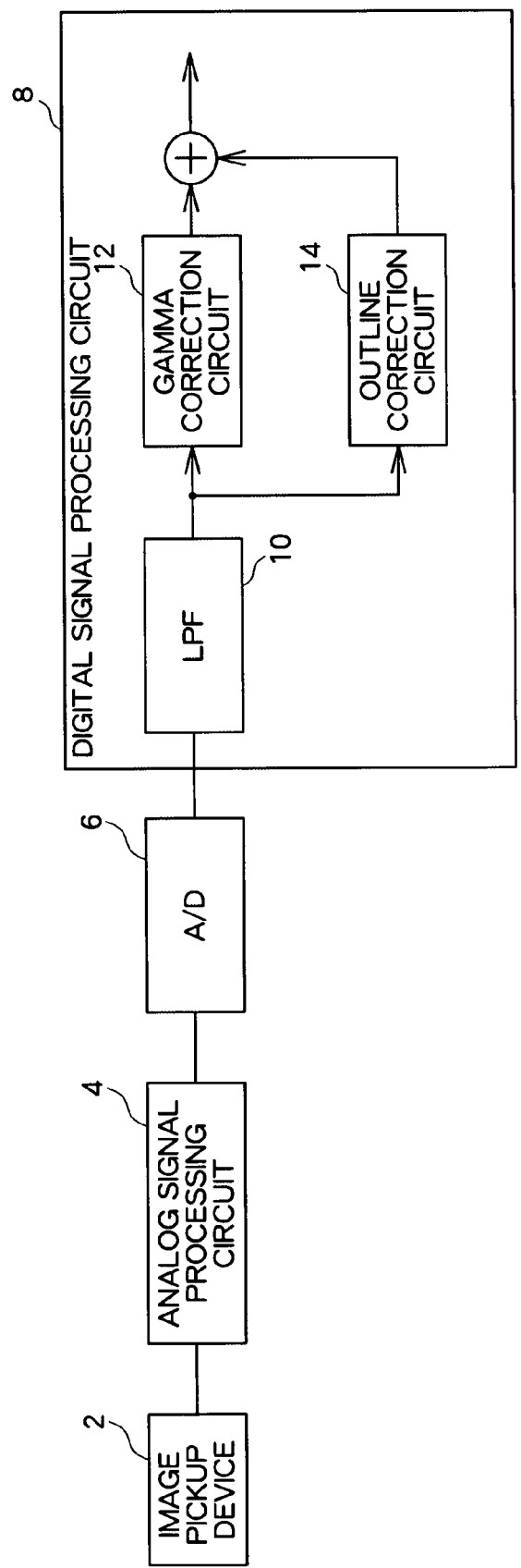
FIG. 1 is a block diagram showing the configuration of a conventional image signal processing apparatus.

First, basic configurations of an image signal processing apparatus according to a preferred embodiment of the present invention will be outlined.

A first basic configuration of the image signal processing apparatus according to the embodiment of the invention comprises a filter circuit for attenuating a noise component included in an image signal, a noise component attenuation characteristic of the filter circuit being variable; and a filter control circuit for setting the attenuation characteristic of the filter circuit in accordance with an exposure time that is employed by an image pickup device in generating the image signal.

One example of the image signal processing apparatus is such that the filter circuit is a digital low-pass filter and the filter control circuit changes a cutoff frequency of the digital low-pass filter by changing tap coefficients thereof.

Another example of the image signal processing apparatus is such that the filter circuit has a median filter processing function and the filter control circuit switches between performance and non-performance of the median filter processing function or between median filter sizes.

A second basic configuration of the image signal processing apparatus according to the embodiment of the invention comprises an outline correction circuit for generating an edge enhanced signal by extracting a particular frequency component of an image signal; and a gain control circuit for varying a gain of the edge enhanced signal in accordance with an exposure time that is employed by an image pickup device in generating the image signal.

In the first basic configuration of the image signal processing apparatus, in view of the fact that the magnitude of shot noise due to a dark current varies with the exposure time, the attenuation characteristic of the filter circuit for attenuating a noise component is varied in accordance with the exposure time. For example, when the exposure time is longer than a prescribed reference value, the filter control circuit changes the attenuation characteristic of the filter circuit to one having a high noise component attenuation ability. With this measure, in shooting with such an exposure time that the magnitude of a noise component is in an allowable range, a proper resolution can be maintained by setting an attenuation characteristic having a relatively low noise component attenuation ability. On the other hand, in shooting with an exposure time that causes a large noise component, image quality deterioration due to noise can be suppressed as desired by setting an attenuation characteristic having a relatively high noise component attenuation ability.

In the second basic configuration of the image signal processing apparatus, the gain of the edge enhanced signal is varied in accordance with the exposure time. For example, the gain is reduced when the exposure time is longer than a prescribed reference value. With this measure, proper outline emphasis can be performed when the exposure time is relatively short and noise is low. On the other hand, when the exposure time is relatively long and noise is high, image quality deterioration can be suppressed by lowering the degree of outline emphasis, that is, by decreasing the degree of noise enhancement due to the outline emphasis.

The basic configurations of the image signal processing apparatus according to the preferred embodiment of the invention have been outlined above. Next, the details of the embodiment of the invention will be described below with reference to the drawings.

Figure 2:
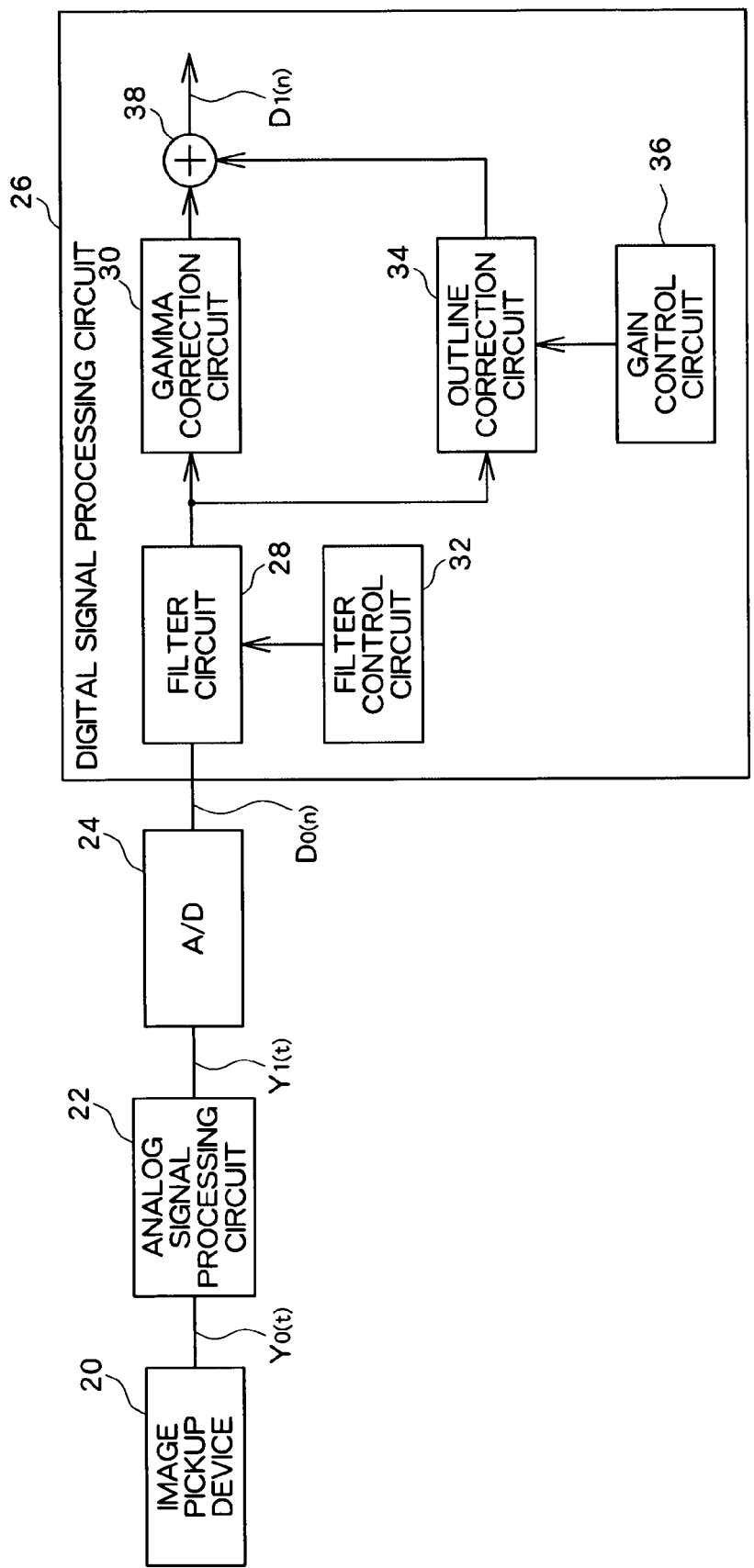
FIG. 2 is a block diagram showing a general configuration of an image signal processing apparatus according to an embodiment of the present invention.

FIG. 2 is a general block diagram showing the configuration of the image signal processing apparatus according to the embodiment of the invention. This image signal processing apparatus generates gradation and outline-corrected image data on the basis of an image signal that is output from the image pickup device 20. In this example, the image pickup device 20 is a CCD image sensor. An image signal Y0(t) that is output from the image pickup device 20 is input to an analog signal processing circuit 22. The analog signal processing circuit 22 performs such processing as sample-and-hold, AGC (auto gain control) on the image signal Y0(t) and thereby generates an image signal Y1(t) having a prescribed format. An A/D conversion circuit 24 converts the image signal Y1(t) that is output from the analog signal processing circuit 22 to digital data and outputs image data DO (n). A digital signal processing circuit 26 takes in the image data DO(n) that is output from the A/D conversion circuit 24, and performs various kinds of processing on it.

In this example, to eliminate noise components such as moire noise, random noise, and horizontal trailing noise, the digital signal processing circuit 26 is equipped with a filter circuit 28 that is a low-pass filter. A gamma correction circuit 30 performs, on an image signal supplied from the filter circuit 28, processing of converting its signal level according to a nonlinear conversion characteristic. Capable of changing its transmission characteristic, the filter circuit 28 changes its noise component attenuation characteristic by changing the transmission characteristic. A filter control circuit 32 controls, in accordance with the signal level of the image signal, the way the filter circuit 28 changes its transmission characteristic.

The digital signal processing circuit 26 is also equipped with an outline correction circuit 34 that generates an edge enhanced signal. A gain control circuit 36 varies the gain of the edge enhanced signal in accordance with the exposure time of the image pickup device 20. Although the digital signal processing circuit 26 can also perform other kinds of signal processing such as color separation, descriptions therefor will be omitted.

Figure 3:
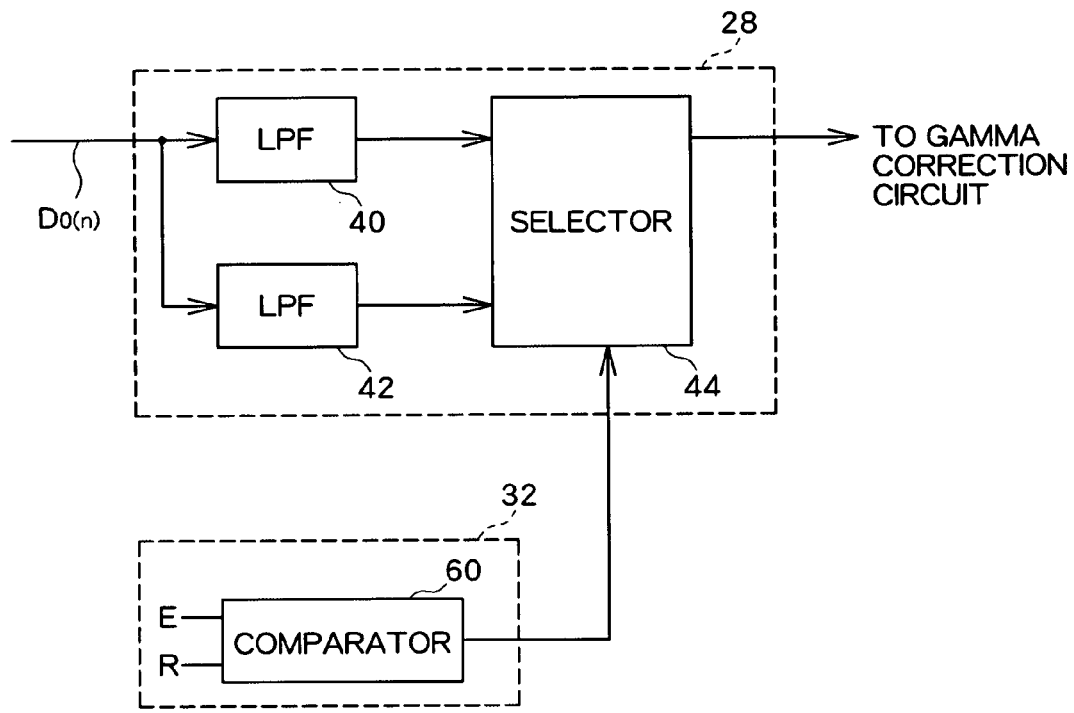
FIG. 3 is a block diagram showing general circuit configurations of an exemplary filter circuit and filter control circuit.

FIG. 3 is a block diagram showing general circuit configurations of the filter circuit 28 and the filter control circuit 32. The filter circuit 28 is composed of two LPFs 40 and 42 having different transmission characteristics and a selector 44 for choosing one of their outputs. Each of the LPFs 40 and 42 includes an LPF (VLPF) for the vertical direction and an LPF (HLPF) for the horizontal direction.

Figure 4:
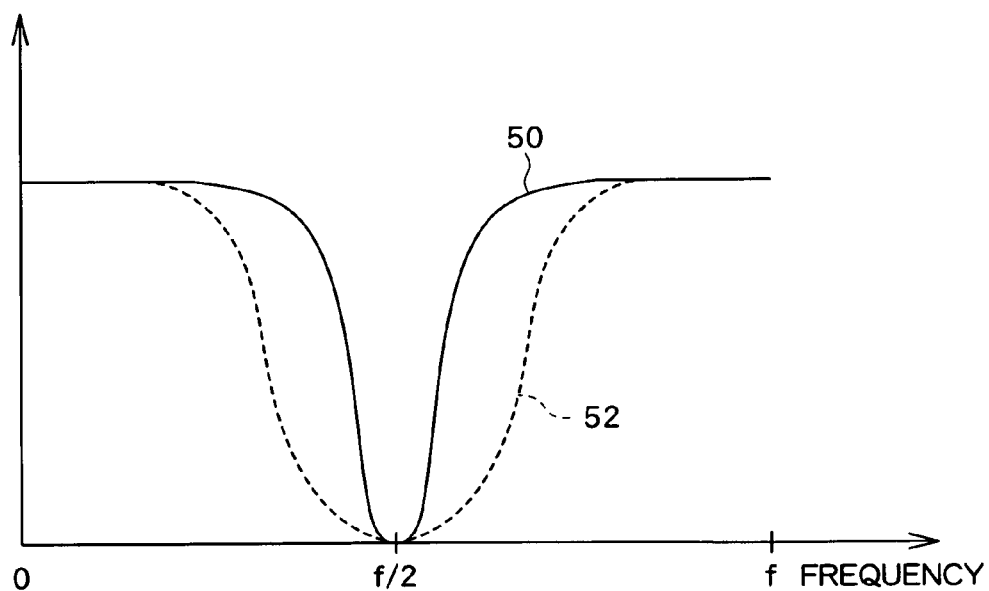
FIG. 4 is a frequency characteristic diagram showing transmission characteristics of LPFs.

Each of the VLPFs of the LPFs 40 and 42 traps a frequency component centered at ½ of a vertical sampling frequency fv, and each of the HLPFs of the LPFs 40 and 42 traps a frequency component centered at ½ of a horizontal sampling frequency fh. FIG. 4 is a frequency characteristic diagram showing exemplary transmission characteristics of the LPFs 40 and 42. The sampling frequency f means the vertical sampling frequency fv or the horizontal sampling frequency fh. Having a minimum point at ½ of the sampling frequency f, each of the LPFs 40 and 42 attenuates an image signal around the minimum point. However, the LPFs 40 and 42 attenuate the image signal in different bandwidths. To avoid lowering the image resolution by the filtering, the characteristic 50 of the LPF 40 is such that the cutoff frequency is set high and hence has a sharp attenuation characteristic around f/2. On the other hand, the characteristic 52 of the LPF 42 is such that the cutoff frequency is set lower than in the characteristic 50 and hence has a gentle attenuation characteristic. As a result, the LPF 42 causes attenuation in a wider band and attenuates a noise component by a higher degree than the LPF 40. The LPFs 40 and 42 can be implemented as a single digital filter, and the characteristics 50 and 52 can be realized by changing its tap coefficients.

The filter control circuit 32 includes a comparator 60. The comparator 60 receives an exposure time E that is set in a timing control circuit (not shown) for controlling the driving of the image pickup device 20. The comparator 60 compares the exposure time E with threshold data R. For example, the comparator 60 outputs a logical value "H" if $E \geqq R$, and outputs a logical value "L" if $E < R$. The data R representing a threshold time is set on the basis of the magnitude of a noise component included in an image signal. As the exposure time becomes longer, the dark current increases and, in turn, the magnitude of a noise component in an image signal usually increases. Therefore, for example, the data R can be set as an exposure time that is measured in advance as corresponding to a maximum allowable noise amount. Alternatively, the apparatus may be configured so that the data R can be adjusted on the basis of results of an observation that a user checks whether or not noise on the screen is conspicuous.

When the output of the comparator 60 is "H", the selector 44 chooses, for the image signal of the current frame, the LPF 42, which causes a higher degree of attenuation to a noise component, and delivers its output to the gamma correction circuit 30. On the other hand, when the output of the comparator 60 is "L", the selector 44 chooses, for the image signal of the current frame, the LPF 40, which causes a lower degree of attenuation to a noise component and hence maintains resolution, and delivers its output to the gamma correction circuit 30.

The digital signal processing circuit 26 integrates the image signal of each frame. And the digital signal processing circuit 26 can perform an automatic exposure control in which a feedback control is performed so that the exposure time is elongated if the integration value is smaller than a target range and the exposure time is shortened if the integration value is larger than the target range.

Figure 5:
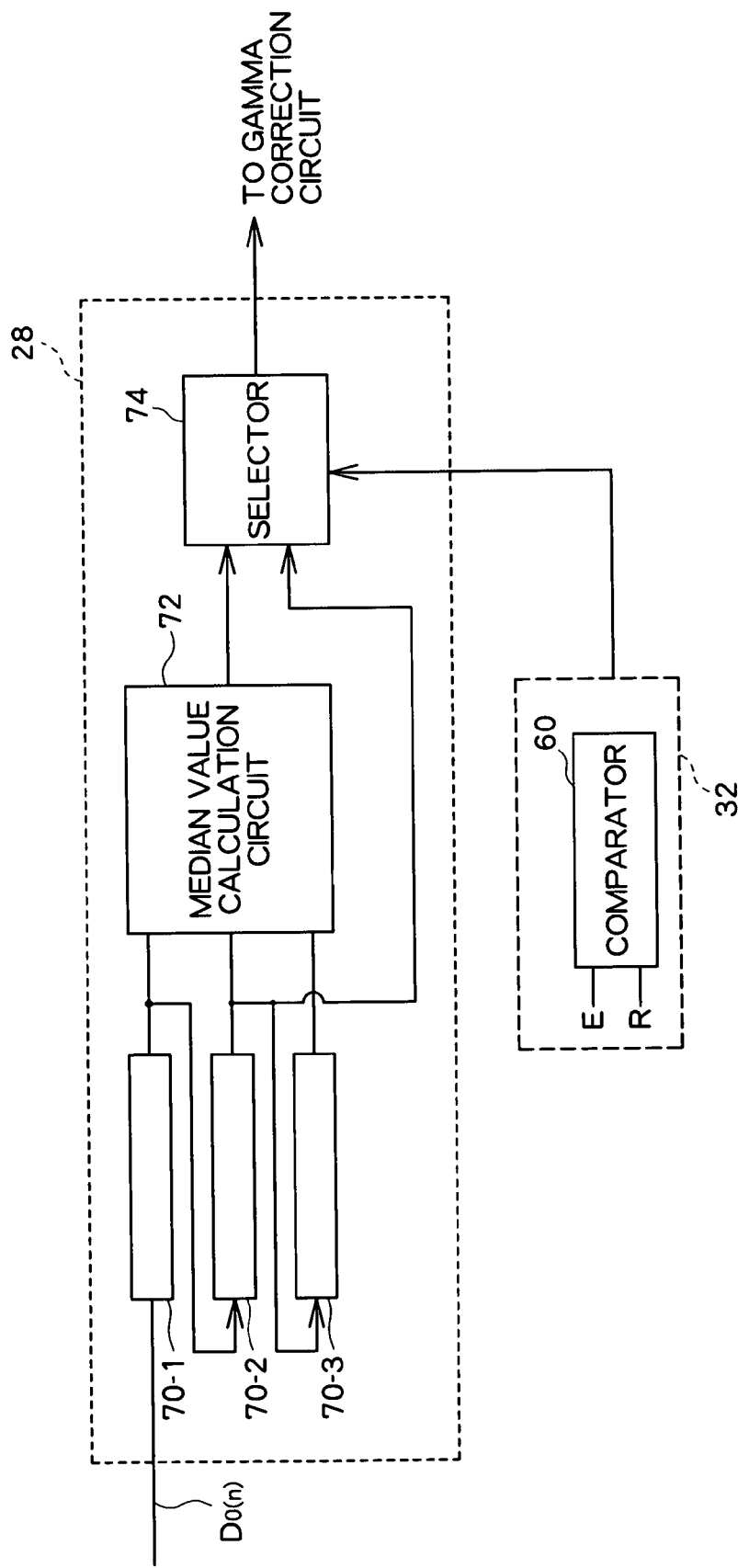
FIG. 5 is a block diagram showing general circuit configurations of another filter circuit and filter control circuit.

FIG. 5 is a block diagram showing other general circuit configurations of the filter circuit 28 and the filter control circuit 32. The filter circuit 28 of this configuration is composed of a median filter consisting of line memories 70-1 to 70-3 and a median value calculation circuit 72 and a selector 74 for choosing one of an output of the median filter and an image signal before entering the median filter. The filter control circuit 32 includes a comparator 60 like the one shown in FIG. 3, and is switched in accordance with the output of the comparator 60.

In this example, the filter size of the median filter is 3×3 pixels and, accordingly, the line memories 70-1 to 70-3 hold image data of three consecutive lines. The line memories 70-1 to 70-3 are connected to each other in cascade. Image data of one line that have been input to the line memory 70-1 are moved to the line memories 70-2 and 70-3 in order as image data of the subsequent lines are input to the line memory 70-1. The median value calculation circuit 72 extracts image data of nine pixels that constitute a 3×3 pixel region from the line memories 70-1 to 70-3, and outputs a median value of the values of the image data of those pixels to the selector 74. On the other hand, the real image data of the central pixel of the nine pixels is input from the line memory 70-2 to the selector 74.

If the exposure time E is smaller than the threshold value R, the comparator 60 of the filter control circuit 32 controls the selector 74 so that the selector 74 outputs the real image data of the central pixel to the gamma correction circuit 30. On the other hand, if E≧R, the comparator 60 of the filter control circuit 32 controls the selector 74 so that the selector 74 outputs an output value of the median value calculation circuit 72.

In this example, one of an output of the median filter whose filter size is 3×3 pixels and real image data that has not been subjected to the median filter processing is chosen. An alternative configuration is possible in which a plurality of median filters having different filter sizes are provided and one of outputs of those median filters is selected in accordance with the exposure time judgment result of the filter control circuit 32. For example, there may be provided a median filter whose filter size is 3×3 pixels and a median filter whose filter size is 5×5 pixels. An output of the 3×3 pixel median filter is chosen if E<R, and an output of the 5×5 pixel median filter, which has a greater noise elimination effect, is chosen if E≧R.

Still another configuration is a combination of the configuration of FIG. 3 (LPF switching) and the configuration of FIG. 5 (use of the median filter). For example, the output of the selector 44 is connected to the input of the line memory 70-1.

Figure 6:
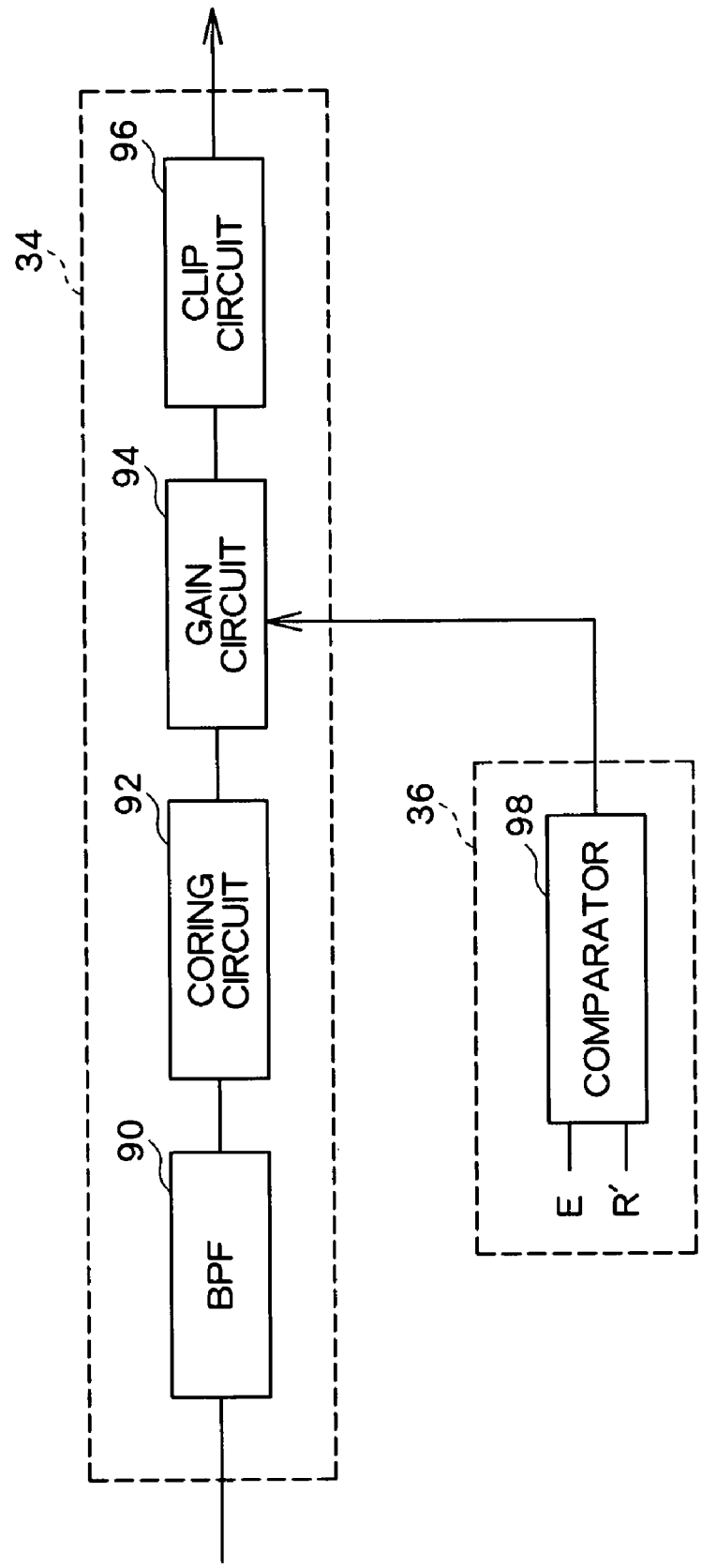
FIG. 6 is a block diagram showing general circuit configurations of an outline correction circuit and a gain control circuit.

FIG. 6 is a block diagram showing general circuit configurations of the outline correction circuit 34 and the gain control circuit 36. Image data are input to a BPF (band-pass filter) 90, which extracts a frequency component of a particular band and outputs a second derivative waveform of the image signal. Noise pulses tend to occur in this extraction processing. A coring circuit 92 is provided to eliminate such noise pulses. The coring circuit 92 transmits only pulses whose amplitudes exceed a prescribed threshold value and eliminates, as noise, pulses whose amplitudes are lower than or equal to the threshold value. Pulses that have passed through the coring circuit 92 are multiplied by a prescribed gain in a gain circuit 94. The second derivative waveform has an amplitude variation that reflects the sharpness of rises and falls of a luminance signal. That is, the shaper the edges of the image are, the higher the degree of outline emphasis is. However, excessively strong outline emphasis makes the image unnatural. A clip circuit 96 is provided to prevent this problem. When the amplitude of the second derivative waveform as gain-adjusted by the gain circuit 94 is higher or lower than a preset upper limit or lower limit, the clip circuit 96 clips the waveform at the upper limit or lower limit.

The gain control circuit 36 includes a comparator 98. Receiving the exposure time E, the comparator 98 compares the exposure time E with threshold data R'. For example, the comparator 98 outputs a logical value "H" if E≧R', and outputs a logical value "L" if E<R'. The threshold data R' is set in accordance with a noise amount included in the image signal. For example, an exposure time corresponding to a maximum allowable noise amount may be measured and set as the threshold data R' in advance. Alternatively, the apparatus may be configured so that the threshold data R' can be adjusted on the basis of results of a user's observation of the screen.

An output of the comparator 98 is input to the gain circuit 94. If the output of the comparator 98 is "H", the gain circuit 94 sets a gain G1 that is lower than an ordinary gain G0 for the image signal of the current frame. On the other hand, if the output of the comparator 98 is "L", the gain circuit 94 sets the ordinary gain G0 for the image signal of the current frame.

For example, as shown in FIG. 2, the output of the filter circuit 28 is used as input image data of the outline correction circuit 34. An edge enhanced signal generated by the outline correction circuit 34 is combined, by an adder 38, with the image signal that is output from the gamma correction circuit 30, and a resulting signal is output to a display device, for example. As described above, in this apparatus, if the exposure time E is longer than or equal to the threshold data R' and hence the amount of noise due to a dark current may be unduly large, the gain of the edge enhanced signal is made lower than the ordinary value, whereby noise is made unnoticeable when a combined image signal that is output from the adder 38 is displayed on the screed.

In the above configuration, in each of the filter control circuit 32 and the gain control circuit 36, the one threshold value R or R' is set to divide the exposure time range into two sections. Alternatively, two or more threshold values may be set to divide the exposure time range into three or more sections. In this case, a selector selects, for the respective sections, filters for causing different degrees of attenuation to a noise component and the gain of the edge enhanced signal is changed for the individual sections.

The above description is mainly directed to a monochrome CCD image sensor. However, the image signal processing apparatus according to the invention can also be applied to an image signal that is output from a CCD image sensor that is provided with color filters of a plurality of colors. For example, where an image signal that is output from an image sensor provided with mosaic color filters is to be processed, the apparatus may be configured in such a manner that the signal level judgment in the filter control circuit 32, the filtering in the LPFs 40 and 42, and the median filter processing in the median value calculation circuit 72 are performed on a luminance signal or pixels of the same color that are arranged periodically in the vertical and horizontal directions.

What is claimed is:

1. An image signal processing apparatus for processing an image signal that is generated by an image pickup device, comprising:

an automatic exposure control circuit for integrating the image signal and performing an automatic exposure control to elongate or shorten an exposure time in accordance with an integration value;

a filter circuit for attenuating a noise component included in the image signal of each pixel in a frame using the image signal of a plurality of pixels in the frame, a noise component attenuation characteristic of the filter circuit being variable; and a filter control circuit for setting the attenuation characteristic of the filter circuit in accordance with the exposure time that is generated in the automatic exposure control circuit and employed by the image pickup device in generating the image signal, wherein the filter circuit is a digital low-pass filter, and the filter control circuit changes a cutoff frequency of the digital low-pass filter by changing tap coefficients thereof.

2. The image signal processing apparatus according to claim 1, wherein the filter circuit includes a vertical low-pass filter for attenuating a frequency component around ½ of a vertical sampling frequency of an image and a horizontal low-pass filter for attenuating a frequency component around ½ of a horizontal sampling frequency of the image, and wherein the vertical low-pass filter and the horizontal low-pass filter are connected to each other in series and have variable attenuation characteristics.

3. The image signal processing apparatus according to claim 2, wherein the vertical low-pass filter and the horizontal low-pass filter have variable cutoff frequencies, and wherein the filter control circuit varies the respective cutoff frequencies of the vertical low-pass filter and the horizontal low-pass filter in accordance with the exposure time.

* * * * *